United States Patent [19]
Pollack et al.

[11] Patent Number: 5,181,975
[45] Date of Patent: Jan. 26, 1993

[54] INTEGRATED CIRCUIT TRANSPONDER WITH COIL ANTENNA IN A PNEUMATIC TIRE FOR USE IN TIRE IDENTIFICATION

[75] Inventors: Richard S. Pollack; John R. Phelan, both of Boulder; Ronald M. Ames, Aurora; Gene R. Starkey, Longmont, all of Colo.; Robert W. Brown, Medina, Ohio; Gary T. Belski, Massillon, Ohio; William F. Dunn, Stow, Ohio

[73] Assignee: The Goodyear Tire & Rubber Company, Akron, Ohio

[21] Appl. No.: 676,153

[22] Filed: Mar. 27, 1991

[51] Int. Cl.$^5$ ............................................. G08B 29/00
[52] U.S. Cl. ................................. 152/152.1; 152/526; 152/539; 340/825.54; 340/825.72
[58] Field of Search ............ 152/450, 539, 526, 152.1; 340/825.54, 825.72, 446, 447, 448; 116/34 B; 73/146.5, 146.8; 200/61.22, 61.23, 61.24, 61.25, 61.26

[56] References Cited

U.S. PATENT DOCUMENTS

| | | | |
|---|---|---|---|
| 3,770,040 | 11/1973 | DeCicco | 152/152.1 |
| 3,893,228 | 7/1975 | George et al. | 437/93 |
| 4,317,126 | 2/1982 | Gragg | 357/26 |
| 4,392,382 | 7/1983 | Myers | 73/708 |
| 4,446,447 | 5/1984 | McNamara | 331/42 |
| 4,543,457 | 9/1985 | Petersen et al. | 200/61.25 |
| 4,578,992 | 4/1986 | Galasko et al. | 73/146.5 |
| 4,588,978 | 5/1986 | Allen | 340/448 |
| 4,695,823 | 6/1987 | Vernon | 340/447 |
| 4,701,826 | 10/1987 | Mikkor | 361/283 |
| 4,730,188 | 3/1988 | Milheiser | 344/825 |
| 4,856,993 | 8/1989 | Maness | 433/68 |
| 4,911,217 | 3/1990 | Dunn et al. | 152/152.1 |

FOREIGN PATENT DOCUMENTS

| | | |
|---|---|---|
| 0301127 | 2/1989 | European Pat. Off. |
| 0364044 | 4/1990 | European Pat. Off. |
| 0364045 | 4/1990 | European Pat. Off. |
| 3912016 | 10/1990 | Fed. Rep. of Germany |
| 3912034 | 10/1990 | Fed. Rep. of Germany |
| 63-306905 | 12/1988 | Japan |
| 8703077 | 12/1987 | Netherlands |
| 8802480 | 10/1988 | Netherlands |
| 8802483 | 10/1988 | Netherlands |
| WO90/12474 | 10/1990 | PCT Int'l Appl. |
| 2214673 | 9/1989 | United Kingdom |

OTHER PUBLICATIONS

ID Expo Proceedings, 1988, pp. 305-1-305-7, Opportunities and Challenges for the Radio Frequency Identification Industry, Ron Ames, Ames & Associates.
Tiris Registration and Identification System, ©1988 by Texas Instruments.
ID Systems, The Debut of TI's RF/ID Technology, Kevin R. Sharp, vol. 10, No. 11, Nov. 1990.
"Near Field Communication", A. Przedpelski, RF Design, Mar./Apr. 1984.

*Primary Examiner*—Michael W. Ball
*Assistant Examiner*—Francis J. Lorin
*Attorney, Agent, or Firm*—David E. Wheeler; Robert W. Brown

[57] ABSTRACT

A pneumatic tire has an integrated circuit transponder which, upon interrogation by an external RF signal, transmits tire identification and/or other data in digitally-coded form. The transponder has a coil antenna of small enclosed area as compared to the area enclosed by an annular tensile member comprising a bead of the tire. The annular tensile member, during transponder interrogation, acts as the primary winding of a transformer. The coil antenna is loosely coupled to the primary winding and is the secondary winding of the transformer. The coil antenna is substantially planar in shape, and, when positioned between the innerliner of the tire and its carcass ply, the transponder may include a pressure sensor responsive to tire inflation pressure.

42 Claims, 8 Drawing Sheets

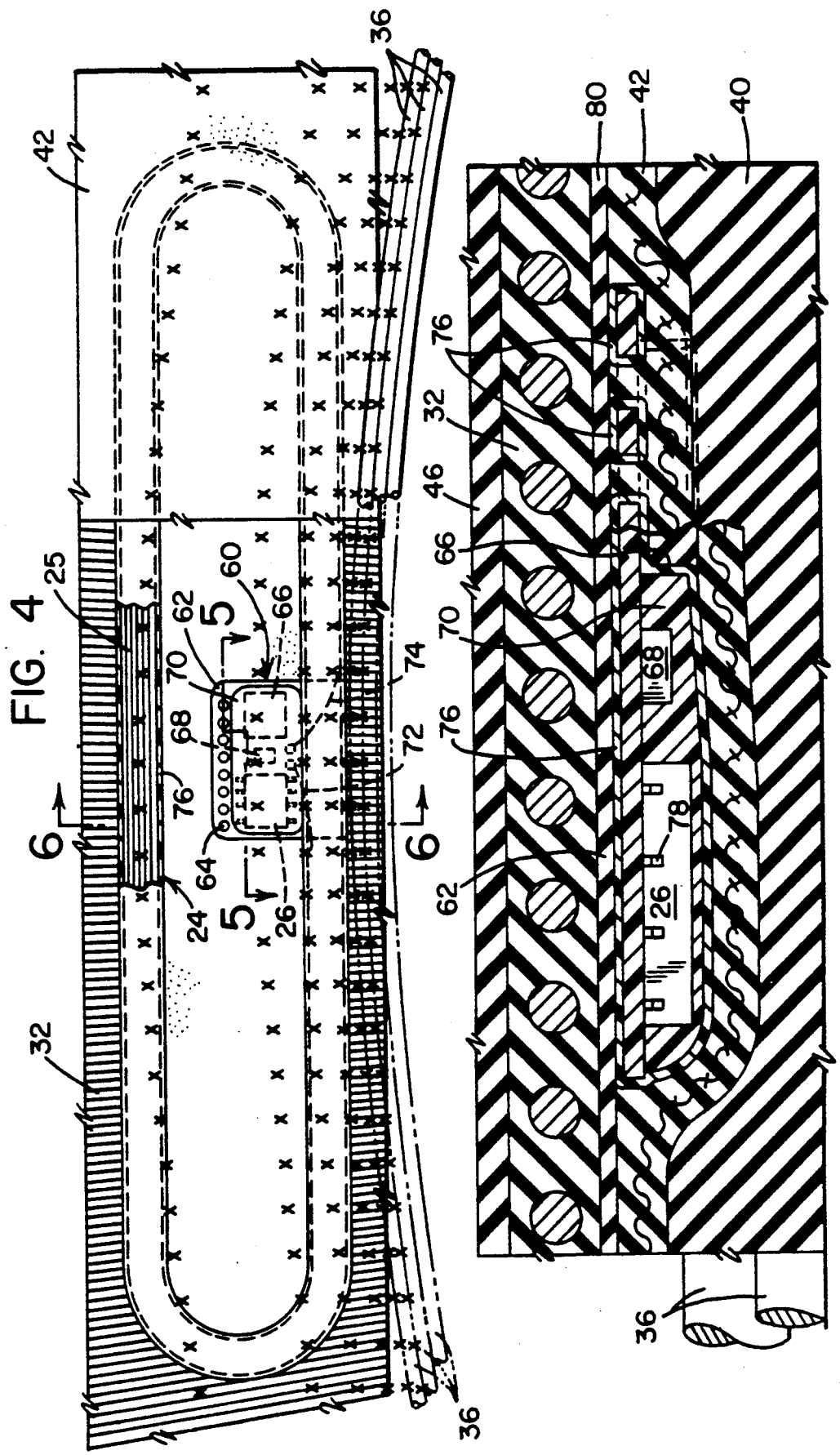

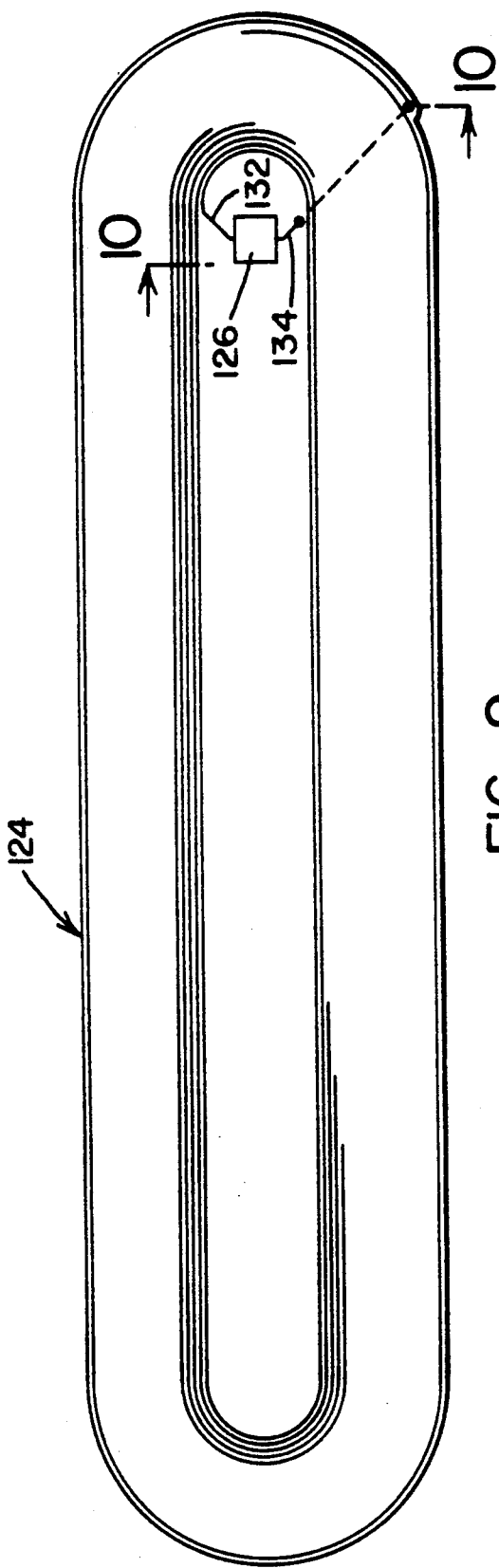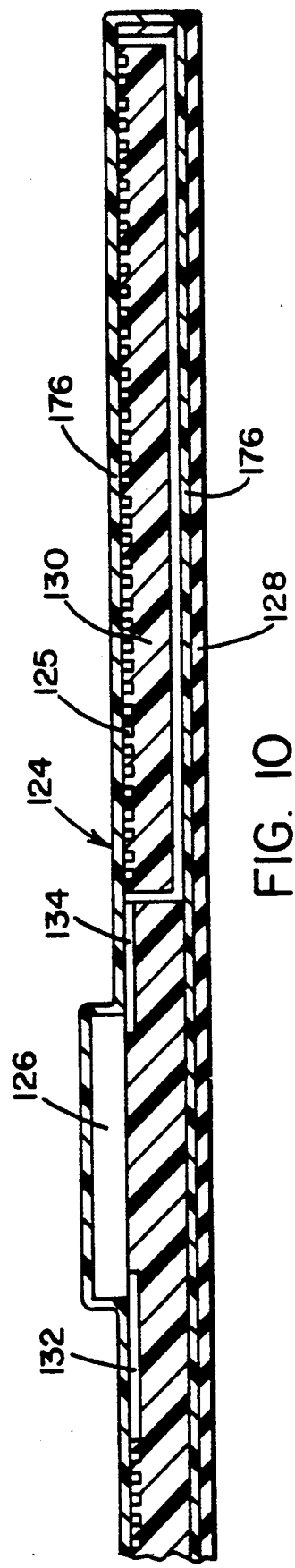
FIG. 9
FIG. 10

INTEGRATED CIRCUIT TRANSPONDER WITH COIL ANTENNA IN A PNEUMATIC TIRE FOR USE IN TIRE IDENTIFICATION

BACKGROUND AND PRIOR ART

This invention relates to a pneumatic tire having an integrated circuit transponder located within the structure of the tire for use in tire identification and/or other data transmission. More particularly, the invention relates to the combination of a pneumatic tire and a transponder of the type using an electrical coil as its antenna. The transponder is a passive device in that it has no source of electrical energy but instead depends upon the receipt of an "interrogation" signal emanating from a source outside of the tire. The interrogation signal is rectified by the circuitry in the integrated circuit transponder, which then utilizes the rectified signal as a source of electrical energy for use in its transmission of an electrical signal digitally encoded to identify the tire. A unique code can be used for each tire.

Reference is made to commonly-assigned U.S. Pat. No. 4,911,217 issued Mar. 27, 1990, to Dunn et al. which discloses a commercially-available integrated circuit transponder suitable for use in a pneumatic tire and which discloses an electric-field coupled interrogator/transponder system. The disclosure of U.S. Pat. No. 4,911,217 is incorporated herein by reference and is referred to below as the Dunn et al. patent.

An alternative integrated circuit is commercially available from Texas Instruments of Austin, Tex., and is sold under the name TIRIS TM, for Texas Instruments Registration and Identification System. While these integrated circuits are not ideal, they are preferred because of their commercial availability. The integrated circuit disclosed in U.S. Pat. No. 4,911,217 also is preferred because it is the only integrated circuit that has been successfully tested in the subject invention.

In the manufacture of pneumatic tires, it is desirable to provide unique numerical identification for each tire as soon as possible during the course of its fabrication. Also, the identification should be easily discernible throughout both the manufacturing process and the life of the tire, and retreading of the tire should not adversely affect identification. If the tire is mounted on a steel or aluminum wheel, as is the normal case, or on a dual wheel assembly, then the tire identification should still be easily acquired by tire owners and users for use in inventory control, record keeping and warranty determination. The ability to identify tires throughout their manufacture is particularly valuable in quality control because the source of manufacturing problems can be much more readily ascertained than is the case in the absence of specific tire identification. Statistical process control and other methods can be used with tire identification to detect process parameters that are going out of control or to detect machinery wear, failure, or maladjustment. These benefits of tire identification practically speaking cannot be obtained unless a radio-frequency transponder is available for incorporation in a tire. The transponder must be quite inexpensive, reliable, and readable from any position around the tire or vehicle wheel on which it is mounted; it also must survive manufacturing processes, be usable during the course of manufacture and must not adversely affect tire life or retreadability.

Unfortunately, the Dunn et al. system of electric field coupling has been found inadequate for use in steel-reinforced truck tires because of the power and other restrictions applicable to tire identification. The Federal Communications Commission, for example, in Part 15 of the FCC Regulations applicable to low power communications devices, specifies radiation limits as a function of frequency. This is done in a step fashion, such that the greatest field strength is permitted in the frequency range from 9 KHz to 490 KHz. In this frequency range, the measurement distance for field strength from the source of the radiation is 300 meters and the field strength, in microvolts per meter, must be less than 2400 divided by the frequency F in KHz. At frequencies from 490 KHz to 1705 KHz, the field strength can be 10 times as great, i.e., 24,000 microvolts per meter divided by the frequency in KHz, but the measurement distance is only 30 meters instead of 300. This means that the permitted transmitter power levels are considerably less at these higher frequencies because field strength is inversely related to the square of the distance from the source (the cube of the distance for near-field effects). This dictates the use of the lower frequencies in tire identification applications.

It was stated above that it is desirable in a tire application to be able to read the transponder identification and data information from any position around the circumference of the tire. The Texas Instruments' TIRIS TM and Destron/IDI integrated circuits, the latter of which is described in Dunn et al., were designed primarily for use in animal identification. In animal identification applications, the integrated circuits are attached to a small electrical coil having a ferrite core within it, and a capacitor may be connected in parallel with the coil as well if it does not have enough parasitic capacitance for tuning of the parallel circuit to the frequency of the interrogation signal used to activate the transponder. The aspect ratios of the coil and ferrite core are very low in that the coil diameter is much smaller than its axial length. These components typically are enclosed within a glass or plastic tube that is sealed at the ends. The capsule formed in this manner then can be injected into an animal for permanent animal identification.

One of the inventors in 1986 placed one of these miniature animal-identification transponders into a pneumatic tire for preliminary evaluation. The integrated circuit was of the type described in the Dunn et al. patent, but the Texas Instruments TIRIS TM device for animal identification now also has been placed in tires for evaluation. These devices, while being placed parallel with the wires in the bead bundle of the tire and near it, have had the disadvantage that interrogation and identification could only be achieved in the area of the tire near the location of the transponder, that is, the transponder could not be interrogated from any position around the tire. Another disadvantage of these very small devices is that their ferrite cores provide greater frequency selectivity than is desirable for a high volume, inexpensive transponder intended for industrial and commercial use. While the high selectivity or "Q" of a ferrite-coil-tuned circuit is desirable in many radio frequency applications, transponder applications require that a single reader be capable of reading many transponders, which, if selective in frequency, must be precisely tuned so that all can be read with the same precisely tuned interrogation signal.

Several years ago, Identification Devices, Inc. of Boulder, Colo., discussed tire identification applications of transponders with several of the present inventors.

As a result of these discussions and perhaps others, Identification Devices became aware of the desirability of being able to read a transponder from any location around the tire. Subsequently, Destron/IDI (a legal entity that purchased assets of Identification Devices) proposed the vehicle tire identification system described in the international application published under the Patent Cooperation Treaty as Publication No. WO90/12474 dated Oct. 18, 1990 (hereinafter referred to as the PCT publication).

In essence, the invention disclosed in the PCT publication involves a transponder coil having one or more conductive turns as an antenna, the lead wires of which must be electrically connected to the integrated circuit of a transponder. The antenna is positioned in a vehicle tire having sidewall and tread surfaces. The antenna coil and the integrated circuit are positioned "internally to said tire with said coil positioned with the loop thereof in a relatively constant relationship relative to one of said tire surfaces" (amended claim 1 of the PCT publication). This, in effect, means that the coil in the disclosed system must be, as illustrated, larger than the bead diameter of the tire, circular in shape, and coaxial with the tire's axis of rotation.

Several of the inventors witnessed a demonstration by Destron/IDI of its device, which included a coil and transponder attached to its ends. The coil and transponder were temporarily attached to the innerliner of an unmounted pneumatic truck tire. The transponder in this demonstration tire could be read from any location around the tire with the interrogation signal provided by the Destron/IDI reader. This demonstration took place in April of 1989, a date subsequent to the Mar. 31, 1989 priority date indicated in the PCT publication.

The inventors do not regard the apparatus described in the PCT application as being suitable for pneumatic tire use because, as taught by the inventors in the PCT publication, the coil must be located away from the bead area of the pneumatic tire, such as in the tread area or upper sidewall, and because the integrated circuit must be electrically connected to the ends of the large-diameter antenna coil in these high-deformation areas of the tire.

A pneumatic tire is a laminated article which begins with a cylindrical shape approximately equal in diameter to that of the tire's bead diameter. During manufacture, the beads are brought axially toward one another and the center portion of the tire increases in diameter as the tire takes on its toroidal shape. After this diameter increases, the restrictive belt plies, at least in radial ply tires, are added, as is the circumferential tread rubber. Insertion of an antenna of the type described in the PCT publication in a laminated pneumatic tire, with the integrated circuit connected between the coil ends, would have to be accomplished after the tire had taken on its toroidal shape and would have to accommodate the further expansion of the toroidal shape when the tire is forced radially outwardly into the mold cavity. This would require the capability of elongation in the conductive material forming the antenna coil, and the integrated circuit connections to the coil would be required to withstand tensile stress. Also, a transponder of this design would not be expected to be durable in normal tire use because of its required positioning in the upper sidewall or tread areas of the tire.

SUMMARY OF THE INVENTION

In accordance with the invention, an integrated circuit transponder with coil antenna in a pneumatic tire is provided for use in radio-frequency transmission of tire identification and/or other data, such as tire temperature or pressure. The invention is able to overcome the disadvantages of the prior art as described above.

More specifically, an integrated circuit transponder is located within the structure of the pneumatic tire for use in its identification or for use in transmitting data accumulated at the transponder location. The tire has two spaced beads respectively including an annular tensile member of wound or cabled steel wire. The tire has a tread, sidewalls, an innerliner and a plurality of plies at least one of which is a continuous ply extending between the annular tensile members. Respective ends of the continuous ply are turned axially and radially outwardly about the annular tensile members. The transponder has separate first and second electrodes and an antenna having first and second leads connected respectively to the first and second electrodes of the transponder. The transponder is able to transmit an electrical signal in response to an oscillating electromagnetic field emanating from a source in contact with or spaced from the tire.

The antenna is in the form of an electrical coil having a plurality of bunched turns and an area enclosed by such turns. The perimeter of this area is defined by the closed curve formed by the locus of points centered within the bunched turns. The area is circular or preferably oblong or otherwise elongated with a diameter or maximum dimension across the area. This maximum dimension is greater than or equal to the cross sectional dimension of the bunched turns in the direction perpendicular to the area enclosed by the turns of the coil. Also, the coil preferably is substantially planar in configuration, the plane of the coil being substantially parallel with the continuous ply of the tire. The antenna coil is positioned as a secondary winding associated with one of the annular tensile members (bead wires or cables) as a primary winding. The coil area is substantially less than the area enclosed by the primary winding annular tensile member. Also, the coil and annular tensile member have different axes such that the coil has a varying relationship with respect to points on the sidewalls and tread of the tire.

The antenna coil is positioned between the inner and outer surfaces of the tire in a location at least partially overlapping the end of the continuous ply turned about the primary winding; preferably, the coil is located radially outwardly of this annular tensile member and the coil and transponder, if installed after tire manufacture, may be made a part of the tire by its incorporation in a patch attached to the tire innerliner or sidewall. The oscillating electromagnetic field to which the transponder is responsive during transponder interrogation has a magnetic field component which passes through the area enclosed by the primary winding annular tensile member causing a magnetic field to encircle the primary winding. The magnetic field encircling the primary winding passes through the area enclosed by the turns of the antenna coil. As a result of this indirect magnetic field coupling, and also whatever direct coupling to the antenna coil may occur due to its proximity to the source, when the magnetic field is sufficiently intense, transmission of the transponder's electrical signal via the antenna is enabled.

Because the annular tensile member of the tire functions as a primary winding having magnetic flux distributed substantially uniformly around its circumference, it is preferable that the antenna coil have the aforementioned oblong shape. This is very much in contrast to the teachings of the electrical arts in general, which specify that, for a given number of coil turns and length, maximum area and flux coupling are achieved with a circular shape. However, the inventors' oblong or elongated and planar shape, with the plane of the antenna coil being substantially parallel with the continuous ply of the tire and with the maximum dimension of the area enclosed by the turns of the coil being substantially parallel with the steel wire comprising the primary winding of the annular tensile member, has been found to have advantages both electrically and mechanically within the laminated tire structure.

The distributed magnetic flux of the primary winding annular tensile member, having greatest intensity adjacent the annular tensile member, provides improved coupling despite the reduction in enclosed area that occurs with the oblong shape. Moreover, the oblong shape, positioned as noted, is advantageous in regard to the toroidal shaping of the tire carcass during manufacture because the changes in shape and dimension of the antenna coil of the transponder are minimized. Durability of the antenna coil during tire use also is improved as a result of the oblong or elongated shape and positioning described above. Also, the planar coil configuration provides flexibility and adhesion to other tire components.

To maximize the rate at which data can be obtained from a transponder, it is desirable to operate at a high frequency. Due to the FCC Regulations, which place limits on the strength of the interrogation signal that powers the transponder, the inventors prefer an interrogation signal frequency of 460.8 KHz. Also, because it is desirable to maintain the simplicity of the transponder by having it derive its required clock signal from the frequency of the interrogation signal, the transponder preferably transmits identification and data signals simultaneously with its receipt of the interrogation signal, but at a lower frequency of, preferably, 115.2 KHz, which is one quarter that of the interrogation signal frequency. Conveniently, this transponder frequency is an integer multiple of the 9,600 and lower baud rates commonly used in serial data communications. The integrated circuit described in the Dunn et al. patent can be operated at these frequencies.

BRIEF DESCRIPTION OF THE DRAWINGS

The invention may be better understood by reference to the detailed description which follows and to the drawings, in which:

FIG. 4 is an enlarged sectional view of the integrated circuit transponder and antenna coil within the tire of FIG. 1, the section being taken along the line 4—4 in FIG. 1;

FIG. 5 is a further enlarged sectional view of the integrated circuit transponder and antenna coil shown in FIG. 4, the view being taken along the line 5—5 in FIG. 4 and depicting in detail the circuit board on which the integrated circuit is mounted along with the capacitor and other materials contained within the laminated structure of the tire;

FIG. 9 is a plan view of an integrated circuit and transponder coil formed on a film of plastic material as an alternative construction;

FIG. 10 is a sectional elevational view of the integrated circuit transponder of FIG. 9;

DETAILED DESCRIPTION

To facilitate understanding of the invention and claims, the following definitions relating to pneumatic tires are provided:

"Axial" and "axially" refer to lines or directions that are parallel to the axis of rotation of the tire;

"Bead" means that part of the tire comprising an annular tensile member wrapped by ply cords and shaped, with or without other reinforcement elements such as flippers, chippers, apexes, toeguards and chafers, to fit the design rim for the tire;

"Belt" means a ply of parallel cords, woven or unwoven, underlying the tread, unanchored to the bead, and having a cord angle, either left or right, in the range from 17° to 27° with respect to the equatorial plane of the tire;

"Breaker" is a word more generic than belt and includes unanchored plies underlying the tread having cord angles with respect to the equatorial plane forming angles, either left or right, up to 90° with respect to the equatorial plane of the tire;

"Carcass" means the tire structure apart from the belt or breaker structure, tread, undertread, and sidewall rubber over the plies, but including the beads;

"Cord" means one of the reinforcement strands of which the plies in the tire are comprised;

"Cord Angle" means the acute angle, left or right in a plan view of the tire, formed by a cord with respect to the equatorial plane;

"Equatorial plane (EP)" means the plane perpendicular to the tire's axis of rotation and passing through the center of its tread;

"Inner" means toward the inside of the tire and "outer" means toward its exterior;

"Innerliner" means the layer or layers of elastomer or other material that forms the inside surface of a tubeless tire and that contains the inflating fluid within the tire;

"Ply" unless otherwise specified means a continuous layer of rubber-coated parallel cords;

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread, provides traction and contains the fluid that sustains the vehicle load;

"Radial" and "radially" are used to mean directions radially toward or away (outward) from the axis of rotation of the tire;

"Radial-ply tire" means a belted or circumferentially-restricted pneumatic tire in which the ply cords which extend from bead to bead are laid at cord angles between 65° and 90° with respect to the equatorial plane of the tire; and "Tread" means a molded rubber component which, when bonded to a tire casing, includes that portion of the tire that comes into contact with the road when the tire is normally inflated and under normal load.

Reference now is made to the drawings, wherein like numerals or identification refer to like parts in the several figures.

Figure 11:
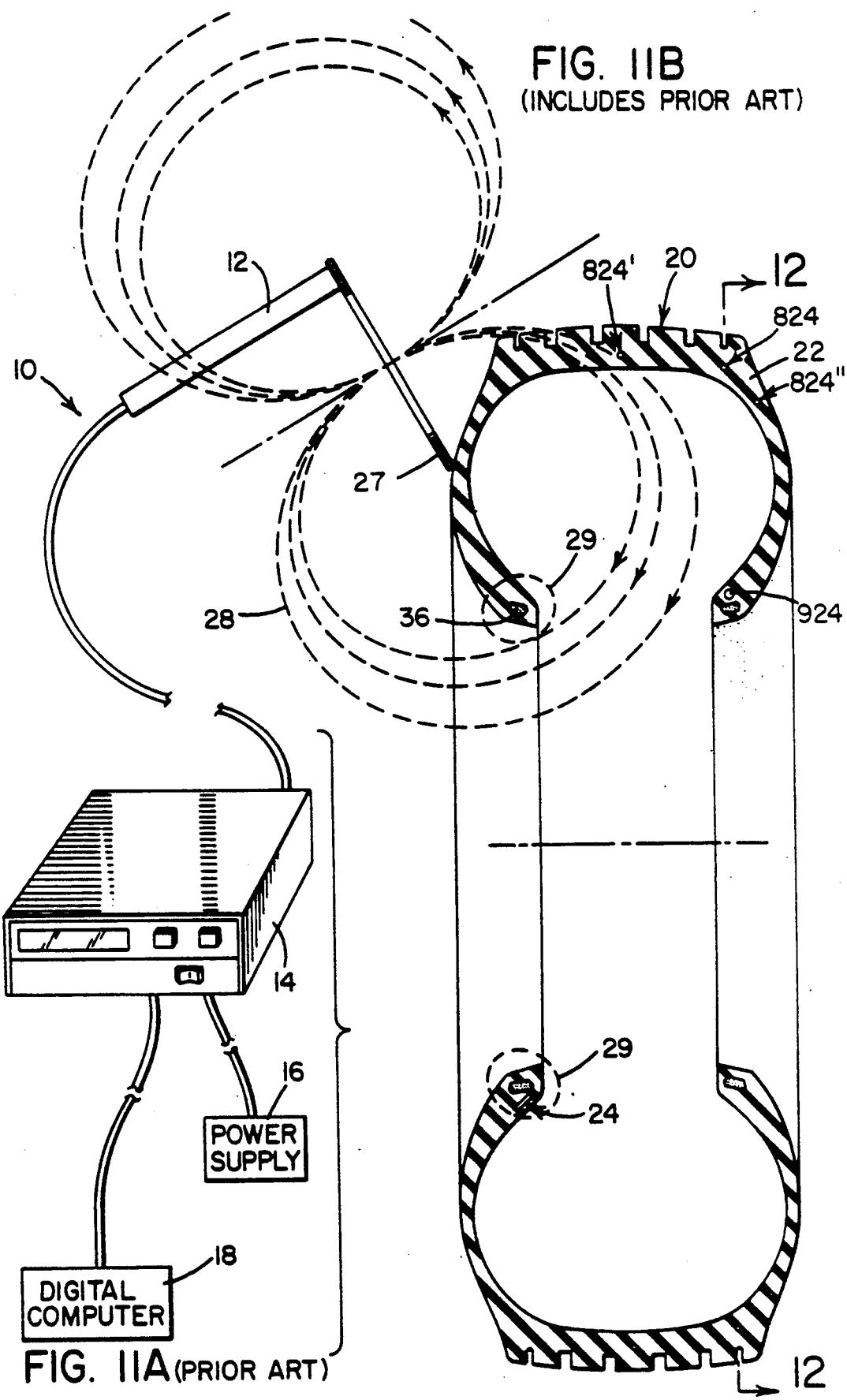
FIG. 11A is a schematic illustration of a prior-art tire identification system that can be used to interrogate the tire and transponder.
FIG. 11B is a sectional view of an integrated circuit and transponder with antenna coil according to the invention, but also illustrating prior art transponders and antenna coils.

In FIG. 11A, there is shown a prior art system including means 14 for generating an oscillating interrogation signal, preferably having a frequency of 460.8 KHz, and for demodulating and displaying an identification number and/or other data transmitted from an integrated circuit transponder and associated antenna coil mounted within a pneumatic tire. The prior art equipment includes a power supply 16 and may include a digital computer 18 for interpreting the data or identification number demodulated with the means 14.

The entire system 10 for interrogating the transponder, generally identified by the numeral 24 in FIG. 11B, includes a wand 12 attached to an interrogation coil or exciter coil 27 positioned adjacent the sidewall of the pneumatic tire 20 in FIG. 11B. The wand 12 may include within it the oscillator circuitry for driving the coil 27 at the interrogation frequency mentioned above. The shape of the wand 12 and exciter coil 27 are shown schematically in FIG. 11B and may take various forms as may be convenient for interrogating the transponder 24 in the tire. For example, if the tire is mounted on the wheel of a truck, the antenna wand and coil may take a different configuration than if the tire is being interrogated while moving down a conveyor line in a tire manufacturing plant or when the tire is being read in its green state, that is, prior to its being cured and while it is yet being fabricated from laminations. Also, the exciter coil 27 may be positioned at the tread of the tire, as well as at the sidewall as shown, or the exciter coil may be positioned near the annular tensile member 36 of the tire. The exciter coil may be in contact with or spaced from the tire during transponder interrogation.

For purposes of reading and activating the integrated circuit transponder 24 of the invention when positioned within the tire 20, it is important that the magnetic field or flux lines 28, which decrease in intensity with distance from the exciter coil 27, be of adequate intensity. If direct coupling to the transponder is insufficient to activate (power) it, then the magnetic flux must pass through the area enclosed by the annular tensile member 36 of the tire.

Although the antenna coil can be directly coupled to the oscillating magnetic field for transponder interrogation, indirect coupling of the field through the annular tensile member makes it possible to interrogate the transponder from any position around the tire. The annular tensile member has the integrated circuit transponder and antenna coil 24 as near to the steel wire or cable as is reasonably practical. The exciter coil 27 may be positioned 180° away from the transponder 24 and yet couple to the annular tensile member 36 and, via an oscillating field generated in it, to the transponder antenna coil as well.

The annular tensile member 36 is formed from wound or cabled steel wire. Due to the magnetic flux 28 passing through annular tensile member 36, an electromotive force is generated in the annular tensile member, which typically has sufficient electrical contact between its various wire components to act electrically as a single turn with some resistance. As a result of the oscillating magnetic field 28 emanating from the exciter coil 27, positioned in contact with the tire or spaced from it and coupling to the annular tensile member 36, an oscillatory magnetic field of identical frequency is established around the annular tensile member 36. This produces magnetic flux as depicted at 29 in FIG. 11B. The magnetic flux surrounding the annular tensile member 36 is uniformly distributed around its circumference but, in the radial direction from the annular tensile member 36, decreases in intensity with the cube of the radial distance from the annular tensile member 36.

The integrated circuit transponder 24 with its associated antenna coil is positioned adjacent the annular tensile member 36 to enable the antenna coil to form the secondary winding of a transformer the primary winding of which is the annular tensile member 36. Thus the antenna coil in the transponder 24 has an enclosed area that intercepts the magnetic flux 29 uniformly distributed circumferentially around the annular tensile member 36 but varying in intensity in the radial direction. Accordingly, it is preferred that the antenna coil in the transponder 24 be oblong or otherwise elongated in shape with its maximum dimension parallel with the curvature or circumferential direction of the annular tensile member 36. In that way, even though the area of the antenna coil is less than the maximum area obtained with a circular coil of the same perimeter, the uniformly distributed field in the circumferential direction of the annular tensile member cuts through the maximum dimension of the oblong area enclosed by the antenna coil. At the same time the higher intensity magnetic flux lines 29 adjacent the annular tensile member 36 also intercept this area. The coil of the transponder 24 preferably is positioned with its enclosed area as perpendicular to the flux lines 29 as possible and preferably as close to the annular tensile member 36 as possible for maximization of the voltage generated in the antenna coil functioning as a secondary winding. Necessarily, this coil positioning also is influenced by details of a particular tire construction and by factors such as the need to acquire and transmit tire pressure or temperature data.

With this background, it now becomes possible to discuss the various embodiments of the invention in further detail.

Figure 1:
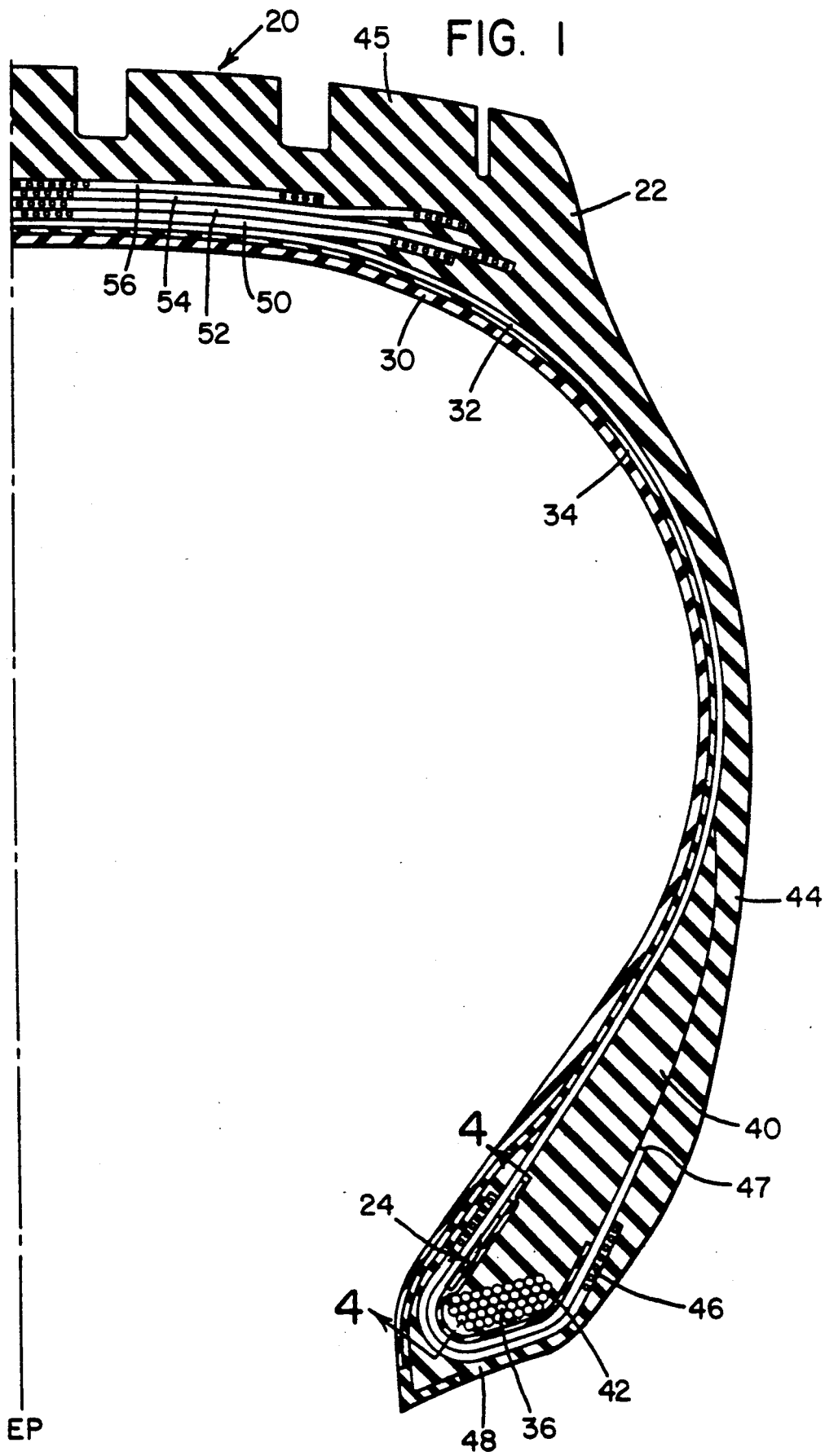
FIG. 1 is a half-sectional view of a radial-ply, steel-reinforced pneumatic truck tire having an integrated circuit transponder and coil antenna located within it.

FIG. 1 depicts in half sectional view a pneumatic truck tire having an integrated circuit transponder 24 including an antenna coil which functions as a secondary winding coupled to the annular tensile member 36 formed from steel wire and acting as a primary winding in the manner described above. The tire 20 is a medium truck tire having a radial ply construction. The tire includes an innerliner 30, a steel-cord 90° radial carcass ply 32 having its respective ends 47 on either side of the tire turned axially and radially outwardly about the respective spaced-apart annular tensile members 36, formed of cable or wound steel wire, in the respective beads of the tire. The beads include an apex 40, a fabric reinforced flipper 42 surrounding the wires in the annular tensile member 36, and a steel-reinforced chipper 46. The apex rubber 40 typically is considerably harder than the rubber in the sidewall 44 and tread 45 of the tire. Between the innerliner 30 and the steel-reinforced ply 32 of the tire is a rubber barrier material 34 which terminates near the toe region 48 of the tire.

The tire 20 further includes a belt or breaker structure including a belt or breaker ply 50 and low-cord angle belt plies 52, 54 and 56. These plies are reinforced with steel cord.

It may be seen in FIG. 1 that the integrated circuit transponder 24 is positioned with its substantially planar antenna coil parallel with the continuous ply 32 extending between the annular tensile members 36 and is adjacent the annular tensile member 36. Also, the transponder 24 is positioned between the ply 32 and the apex 40 and is located on the radially inner side of the end 47 of the turned-up portion of ply 32.

Figure 2:
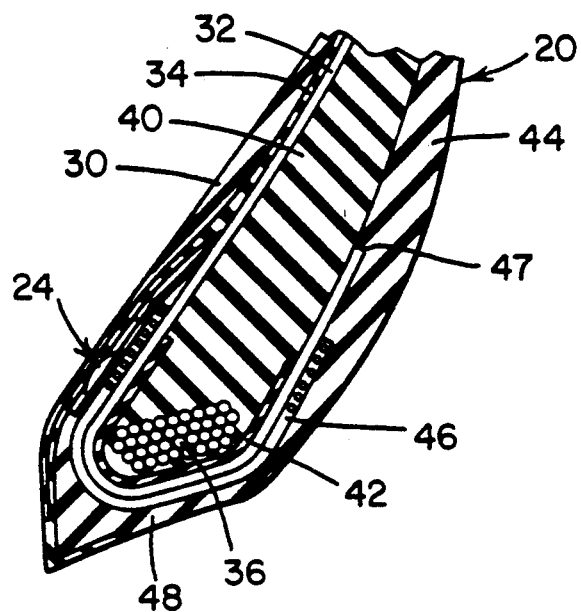
FIG. 2 is a partial sectional view of the tire of FIG. 1, but showing the integrated circuit transponder and antenna coil in an alternate location within the tire.

FIG. 2 is similar to FIG. 1, except that the transponder 24 is positioned on the axially inner side of both the ply 32 and the chipper 46. Thus, in this embodiment the transponder is between these components and the elastomeric materials comprising the barrier 34 and innerliner 30. The transponder preferably is positioned at a location which maximizes the oscillating voltage generated in the transponder antenna coil during interrogation as a result of secondary coupling to the annular tensile member 36 as a primary winding.

Figure 3:
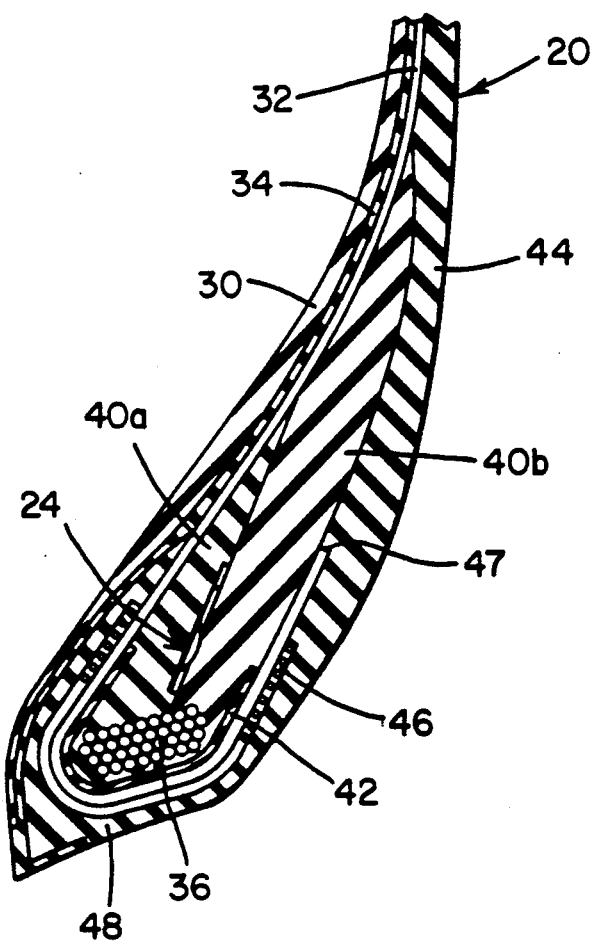
FIG. 3 is a partial sectional view of the tire of FIG. 1, but showing the integrated circuit transponder at another alternate location within the tire.

FIG. 3 is similar to FIGS. 1 and 2 but depicts two apex components 40a and 40b between which the transponder 24 is located adjacent the annular tensile member 36. A single component 40 (not shown in FIG. 3) having a slit or slot also may be used for positioning the transponder 24 in the location shown in FIG. 3. This location for the transponder has the advantage of providing maximum coupling to the annular tensile member as a primary winding during interrogation, but has the disadvantage of requiring two separate apex components. A single component with a slit or slot into which the transponder would be inserted is an alternative, but has disadvantages due to increased manufacturing complexity.

With reference now to FIG. 4, which is taken along the line 4—4 in FIG. 1, the transponder 24 is illustrated with associated antenna coil 25 positioned with its enclosed area parallel with that of the ply 32. The long lower side of the oblong or elongated antenna coil 25 is positioned very near the annular tensile member 36 partially shown in FIG. 4. Of course, the annular tensile member 36 has a curvature and the antenna coil 25 need not precisely follow this curvature. In fact, the transponder 24, when positioned between the ply 32 and apex 40 as illustrated in FIGS. 1 and 4, is applied to the apex material prior to being laminated with this component to the ply on the tire building drum conventionally used during tire manufacture. Shaping of the tire 20 into a toroidal configuration causes the steel cords in the ply 32 to diverge as the radius of the shaped tire increases, and this causes some distortion in the antenna coil 25 during tire manufacture. Ideally, the coil would have a kidney or banana shape in the finished tire such that the coil curvature would follow that of the annular tensile member 36.

The transponder 24 includes an integrated circuit 26 mounted on a circuit board shown generally with its various components at 60. The circuit board 62 is adhered to the antenna coil 25 with a suitable epoxy or other adhesive compatible with the polyester insulation provided on the wire forming the antenna coil 25. The printed circuit board has openings 64 and 66 through which elastomer may flow to increase the adhesion of the transponder 24 to the other tire components. These holes can have a conductive plating material for use as programming and test pads during transponder manufacture. A capacitor 68 is provided for electrical connection in parallel with the coil winding, the leads 72 and 74 of which are connected to electrodes of the transponder 24 and its integrated circuit 26 substantially in the manner that the antennas illustrated and described in the Dunn et al patent are connected.

The lines of X's in FIG. 4 depict the magnetic field lines uniformly distributed along the circumference of the annular tensile member 36, but varying in intensity in an exponentially decreasing manner as a function of radial distance from such tensile member. As previously stated, the tensile member acts as a primary winding of a transformer coupling the magnetic field to the secondary winding 25 in the transponder 24.

FIG. 5 is taken along the line 5—5 in FIG. 4 and illustrates in enlarged view the lead frame connectors 78 of the integrated circuit 26. Also shown is the adhesive material 76 preferably applied to the transponder 24 prior to its insertion in the tire. The flipper 42 is illustrated, as is a gum material 80 that may be applied to one or both sides of the transponder 24 prior to its being laminated in the tire structure during tire manufacture.

Currently, the adhesive 76 is applied in two steps consisting of a primer coat followed by a top coat.

The primer is a commercial material made by Lord Corporation, of Erie, Pa. The material, designated AP133, is applied by brushing on a thin coat or by dipping and allowing the excess to drain off the transponder 24. Drying is at room temperature in air for 5-10 minutes until the coated device is dry to the touch.

The top coat also is a commercially available material made by Lord Corporation. This material, known as ChemLock 250 TM, is applied by brushing on a thin coat or by dipping and allowing the excess to drain off the transponder. Drying is at room temperature in air for 5-10 minutes until dry to the touch.

The treated transponder 24 may be placed between thin sheets of gum 80 (on one side only or on both sides) and pressed to remove air bubbles from the laminate.

After this the transponder 24 may be placed into the tire 20 during a point suitable for tire manufacture, such as to the apex 40 prior to its incorporation in the tire structure. In the FIG. 2 location of the transponder 24, the transponder 24 would be applied directly to the barrier material 34 after it and the innerliner had been applied to the tire building drum. In the FIG. 3 location for the transponder 24, the transponder after treatment as indicated above would be positioned between the apex components 40a and 40b prior to assembly of the apex with the annular tensile member or with other laminated tire components.

Figure 6:
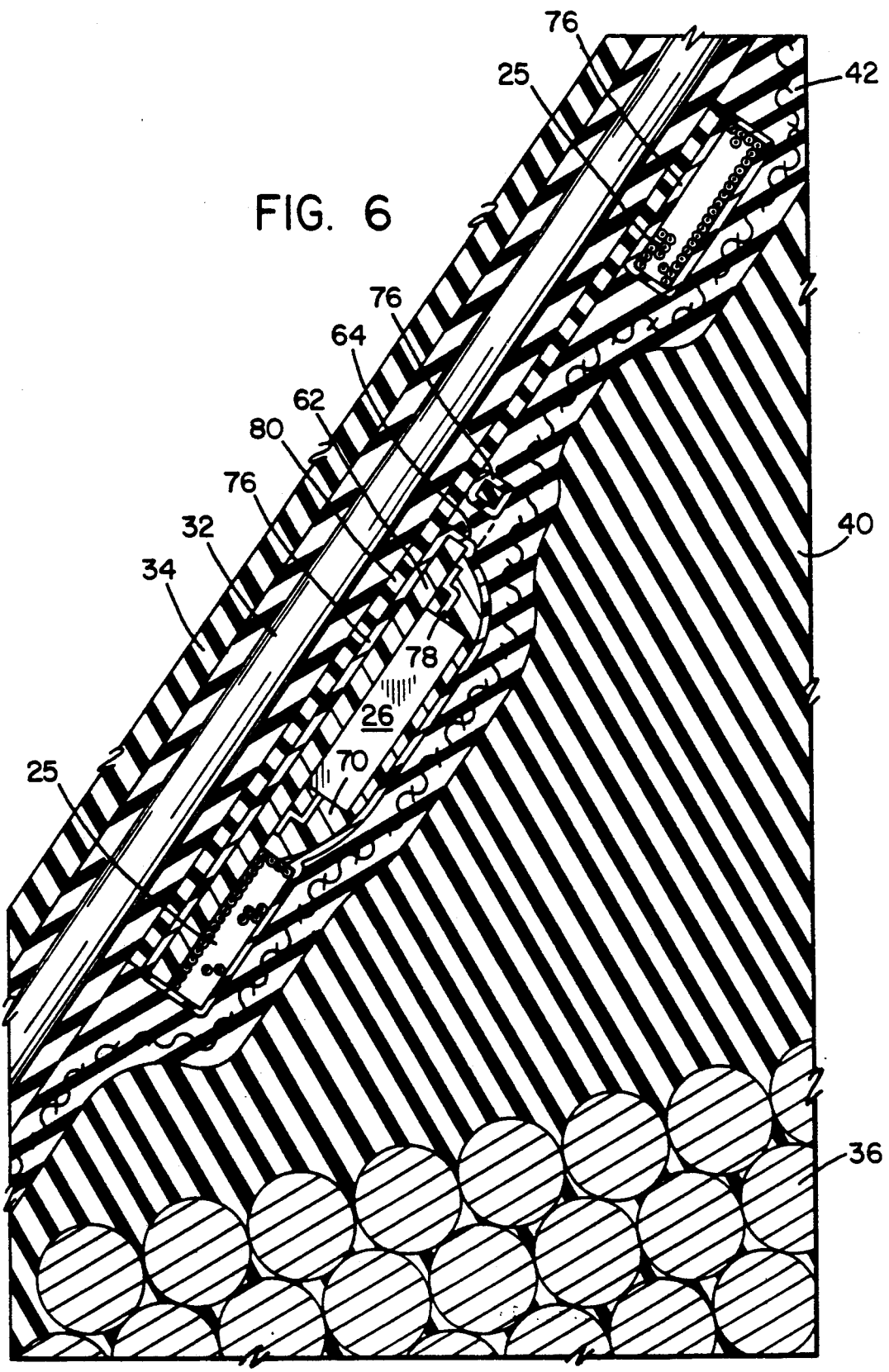
FIG. 6 is an enlarged view on the scale of that shown in FIG. 5, is taken along the line 6—6 in FIG. 4, and further details the integrated circuit transponder, antenna coil, and their relationship to the circuit board, and also shows the bead wires or annular tensile member forming the primary winding for which the antenna coil of the transponder is the secondary winding.

In the enlarged view of FIG. 6, taken along the line 6—6 in FIG. 4, the relationship of the antenna coil 25 to the other components of the transponder 24 is clearly illustrated. The proximity of the antenna coil 25 to the wires in the annular tensile member 36 is depicted, as is the packaged integrated circuit 26 with its lead frame components 78.

The integrated circuit package 26 and capacitor 68, as well as the coil lead wires 72 and 74 at their junction with the printed circuit board terminals, are coated with a suitable epoxy material 70 or other encapsulant material suitable for use with elastomeric compositions and electronic components. Materials currently preferred are HYSOL ™ FP4332-ES4322 and HYSOL ™ FP4340-ES4340 available from Dexter Corporation, Electronic Materials Div., Olean, N.Y. and Industry, Calif.

Figure 7:
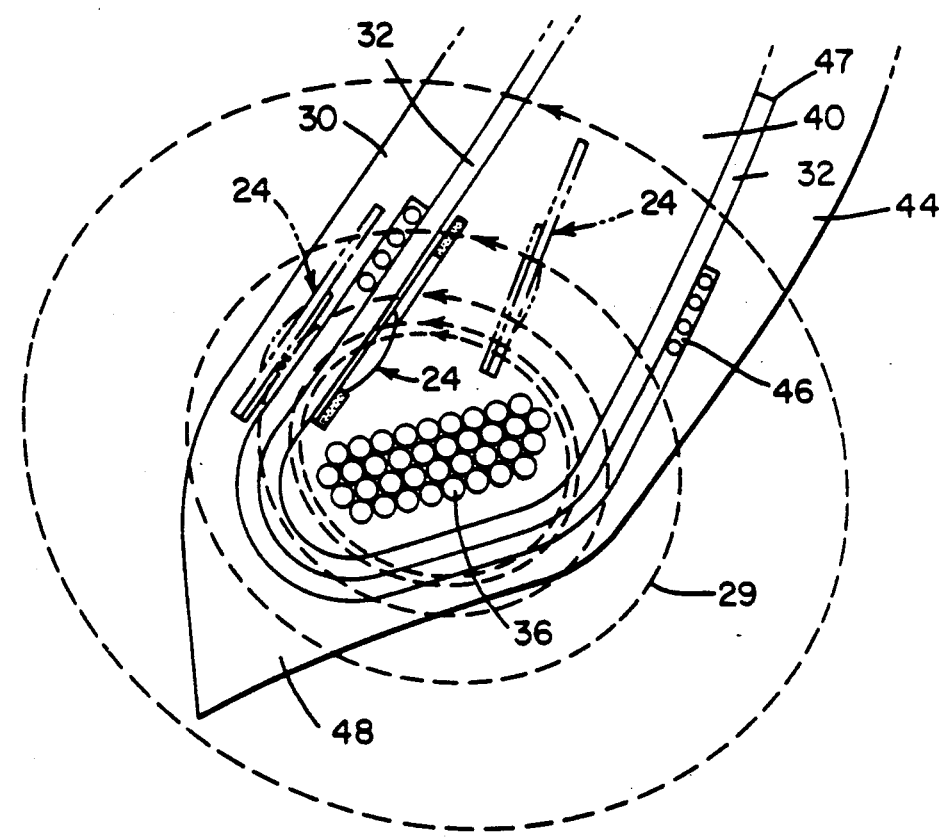
FIG. 7 is a diagrammatic view of the bead area of a pneumatic tire illustrating the integrated circuit and transponder in the three alternate positions depicted in FIGS. 1, 2 and 3, and further illustrating the magnetic field coupling of the annular tensile member or bead wire to the antenna coil of the transponder during interrogation of the transponder by a source producing such magnetic field outside the structure of the tire.

In FIG. 7, the three previously-described locations for the transponder 24 are illustrated in diagrammatic form in relation to the magnetic flux lines 29 emanating from the annular tensile member 36 during transponder interrogation. As previously mentioned, simplicity of installation is accomplished when the transponder 24 is located between the ply 32 and the apex 40. A medium amount of flux coupling is achieved at this location because the magnetic flux lines, the configuration of which can only be approximated in this figure, are believed not to intercept the area enclosed by the antenna coil 25 in a perpendicular manner. Thus, the flux vector contributing to the voltage generated within the antenna coil 25 is determined by the cosine of the angle of deviation from perpendicularity, and is less than is believed to occur with the transponder centered within the apex 40 as shown in FIG. 3. On the other hand, this location increases the number of apex components 40a and 40b, or requires that the transponder 24 be inserted within a slit or slot in the apex 40, as was earlier mentioned.

The location within the tire's structure between the innerliner 30 and the ply 32 is desirable for various reasons, including early installation during the building process, but provides a lesser degree of coupling with the magnetic flux 29 than might be desired. However, if the signal emanating from the external-source exciter coil 27 (FIG. 11B) is great enough and if the integrated circuit voltage requirements are not excessive, then this location may be very desirable.

In a tire that has already been manufactured, the transponder 24 may be attached to the axially inner side of the innerliner 30 or to the axially outer side of the tire sidewall 44 by means of a tire patch or similar material or device. This may be useful for identification of a tire during the retreading process or for aftermarket installation of a transponder. Even with this after-tire-manufacture installation of the transponder, it can be coupled to the annular tensile member 36 for interrogation in the manner previously described.

Figure 8:
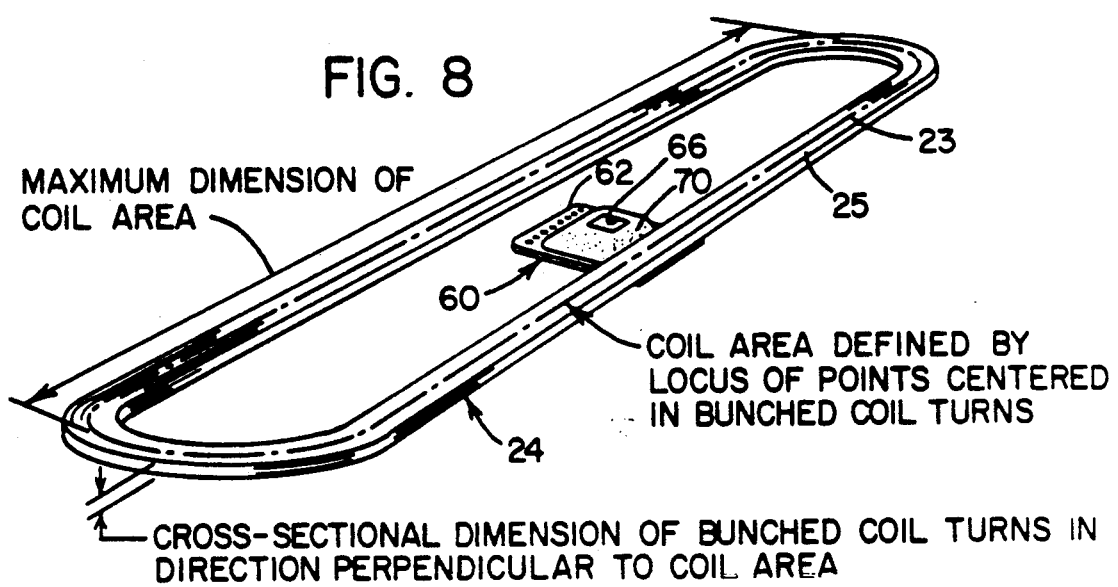
FIG. 8 illustrates the integrated circuit transponder and its antenna coil as existing apart from the structure of the tire.

With particular reference to FIG. 8, there is shown the transponder 24 without the adhesive coating 76 previously described. The transponder is shown in perspective view separate from the tire. The transponder has its antenna coil 25 formed from 70 bunched turns of 36 AWG copper magnet wire. The copper wire has 180° C. thermal class, single layer, solderable polyester insulation with an epoxy heat bondable overcoat (NEMA MW 26 C), as commercially available from MWS Wire Industries, Inc, of Valencia, Calif., or the equivalent. Preferably, the coil is helically-wound, as illustrated in the enlarged view of FIG. 6, to form the turns, which are bunched or gathered together to form a coil of substantially planar configuration.

The printed circuit board 62 preferably is a reinforced epoxy laminate, has a thickness of twenty mils, and has a glass transition temperature exceeding 175° C. A suitable and preferred material is available as "high performance" FR-4 epoxy laminate, grade 65M90, sold by Westinghouse Electric Corporation, Copper Laminates Division, 12840 Bradley Avenue, Sylmar, Calif. 91342. The printed circuit board preferably is attached to a long side of the coil 25, preferably in the center of the long side adjacent the annular tensile member 36, and may be secured with an epoxy adhesive, mechanically or both.

The dot-dash line in FIG. 8 represents the locus of points defining the area enclosed by the coil 25 and is located at the midpoint of the 70 turns included in this preferred embodiment of the coil. It may be seen that coil 25 is essentially flat, that is, its cross-sectional dimension in the direction perpendicular to the coil's area is much, much less than the width and length dimensions of such area. The maximum dimension of the coil area is defined as being within the dot-dash locus lines 23 as shown in FIG. 8, and in the preferred form is approximately six inches long. The width of the antenna coil 25 is approximately 0.95 inch, and the coil thickness in the direction perpendicular to the coil's area is approximately 0.025 inch, which is substantially less than the six-inch maximum dimension of the coil area. Also, it should be noted that the area of coil 25 is much less than the area enclosed by the annular tensile member or bead wire 36 forming the primary winding. In fact, the ratio of areas is on the order of one to one hundred.

A coil length of about four inches may be a practical minimum with currently available electronic system and component limitations in the context of the illustrated tire application. Coil length, width, turns, and electrical resistance may be varied to accommodate electronic and tire application requirements.

During manufacture of the antenna coil 25, the turns are wound on a suitable form. While the coil remains on the form, an electrical current is passed through the coil generating heat that causes the bondable coating on the copper wire forming the coil to fuse. The turns of the coil thus can be bonded together in a unitary structure prior to coating of the transponder 24 with its adhesive coating 76 and application of the device to the tire 20. The bondable coating should not have a melting point below the highest temperature it encounters during tire cure.

The opening or location 66 in or on the circuit board 62 is optional. This location is designed to accommodate a pressure transducer or sensor that could be used should the transponder be positioned between the innerliner 30 and the ply 32, as shown in FIG. 2, or should the transponder 24 be positioned on the axially interior side of the tire by means of a patch or similar device.

The pressure sensor may be made from a pressure sensitive elastomeric material, preferably, such as the variable-conductance elastomeric composition described in concurrently filed and commonly assigned U.S. patent application Ser. No. 07/675,842 now U.S. Pat. No. 5,143,078 of Krishnan et al entitled "Frequency Sensitive Conductive Rubber Composition". In the use of this material as a pressure transducer, the surface conductance may be measured via conductive elements on circuit board 62 in contact with the elastomeric composition. Bulk material conductivity also may be used. The pressure transducer also may be fabricated from conductive inks adhered to film materials, such as are commercially available from Tekscan Inc. of Boston, Mass.; the Tekscan materials provide a change in conductivity as a function of applied pressure. Alternatively, the pressure sensor positioned in the space 66 of the transponder 24 may be a silicon piezoresistive pressure sensor or a silicon capacitive pressure sensor. Of course, suitable connection to the integrated circuit 26 is required and the integrated circuit may include a counter or register or other means for digitizing the pressure sensor data and for transmitting it along with or apart from any tire identification data stored within the memory contained within the integrated circuit.

The pressure sensor used with the transponder 24 preferably will have an operating temperature range of up to 110° C. and will be able to withstand a manufacturing temperature of approximately 177° C. For truck tire applications, the pressure sensor must have an operating pressure range of from 50 to 120 pounds per square inch and should be able to withstand pressure during manufacture of the tire in which it is incorporated of up to 400 pounds per square inch. The accuracy, including the sum of all contributors to its inaccuracy, should be on the order of plus or minus 3% of full scale. Repeatability and stability of the pressure signal must be as required for the specified accuracy range. Of course, an electrical signal is preferred and may be a variable voltage, current, capacitance, or resistance.

The pressure transducer preferably is mounted in or on the printed circuit board 62 as may best accommodate its design and packaging. Electrical connection must be made to the circuit board and to circuitry within the integrated circuit 26 of the transponder. The integrated circuit will provide a supply voltage or current for the transducer included within the pressure sensor. Portions of the circuitry required to transform the signal produced by the pressure transducer into digital data that can be transmitted by the integrated circuit 26 during transponder interrogation may be included in the integrated circuit 26 as earlier mentioned or may be included in a separate device.

The pressure transducer may include another elastomeric material having a variable conductivity, such as that described in R. R. Juengel, Cabot Corporation, "Compounding for Electrical Conductivity", Technical Report RG-128 (Revision No. 2). In such case the elastomer will be within the opening at location 66 depicted in FIGS. 4 and 5, except that the transponder will be positioned between the innerliner 30 and continuous ply 32 as shown in FIG. 2.

If the pressure transducer is mounted on the printed circuit board, the printed circuit board is positioned between the rigid portion of the tire formed by the continuous ply 32 and/or chipper 46. Thus, pressure within the pneumatic tire during its inflated state will be transmitted through the innerliner 32 and barrier ply 34 or other elastomeric material to the pressure transducer mounted on the printed circuit board. The rigid printed circuit board and reinforced ply materials 32 and 46, allow the pressure within the tire to act upon the pressure transducer with a somewhat reduced magnitude due to the presence of the elastomeric innerliner and/or barrier material covering the pressure transducer.

If the pressure transducer is a piezoresistive device, such as one of those shown and described in U.S. Pat. No. 3,893,228 issued in 1975 to George et al or in U.S. Pat. No. 4,317,126 issued in 1982 to Gragg, Jr., or a silicon capacitive pressure sensor, such as that illustrated in U.S. Pat. No. 4,701,826 issued in 1987 to Mikkor, then it preferably will have a size less than 4 square millimeters. The pressure transducer may include circuitry integral with it for converting, for example, a capacitance variation into a voltage, current or frequency variation. Circuitry for generating capacitive to voltage and frequency conversion, respectively, are illustrated in U.S. Pat. No. 4,392,382 issued in 1983 to Myers and U.S. Pat. No. 4,446,447 issued in 1984 to McNamara.

Neither the thermal hysteresis nor pressure hysteresis of the pressure transducer should exceed one percent of its full-scale signal output span. The transducer response time, after voltage application, should be one millisecond, but this may be lengthened to keep the current level down and is dependent upon the requirements of the integrated circuit transponder and its abilities to transmit the pressure data along with tire identification data. For passenger tire applications, the pressure range should be from about 15 psi to 60 or 80 psi.

As noted above, the transponder circuit board 62 has a capacitor 68 mounted on it and connected in parallel with coil 25. This forms a parallel-resonant circuit. Because a majority of the area of coil 25 is fitted with an elastomeric material when manufactured into the tire, which incidentally and very desirably is more flexible than the composite structure forming ply 32, the resonant frequency is affected. Appropriate adjustment of components for this is required. At a desired frequency of 460.8 KHz, the resonant frequency in air must be increased about 10 KHz.

FIGS. 9 and 10 illustrate an alternative embodiment 124 for the transponder. In this embodiment, a thin film of plastic material 130, such as Kapton TM polyimide film, is fabricated by known commercially available techniques. A flat or "pancake" coil 125 is formed from conductive elements embedded or applied to the plastic film material. This is shown in very enlarged form in the partial sectional elevational view of FIG. 10. Approximately 45 turns of wire may be provided in this manner and an integrated circuit 126 may be bonded to the film. Copper conductors 132 and 134 form the leads of coil 125 that are connected to the integrated circuit 126. If the capacitance of the windings is insufficient to produce resonance of the coil, then a capacitor can be attached to the coil to produce resonance at the frequency selected. An adhesive material 176 is applied to the transponder 124, which has an oblong shape as previously described. A gum layer 128 also may be used on one or both sides of the transponder.

The structure of FIGS. 9 and 10 is particularly applicable to the tire location described in connection with FIG. 2 and may include a suitable pressure sensor.

Figure 12:
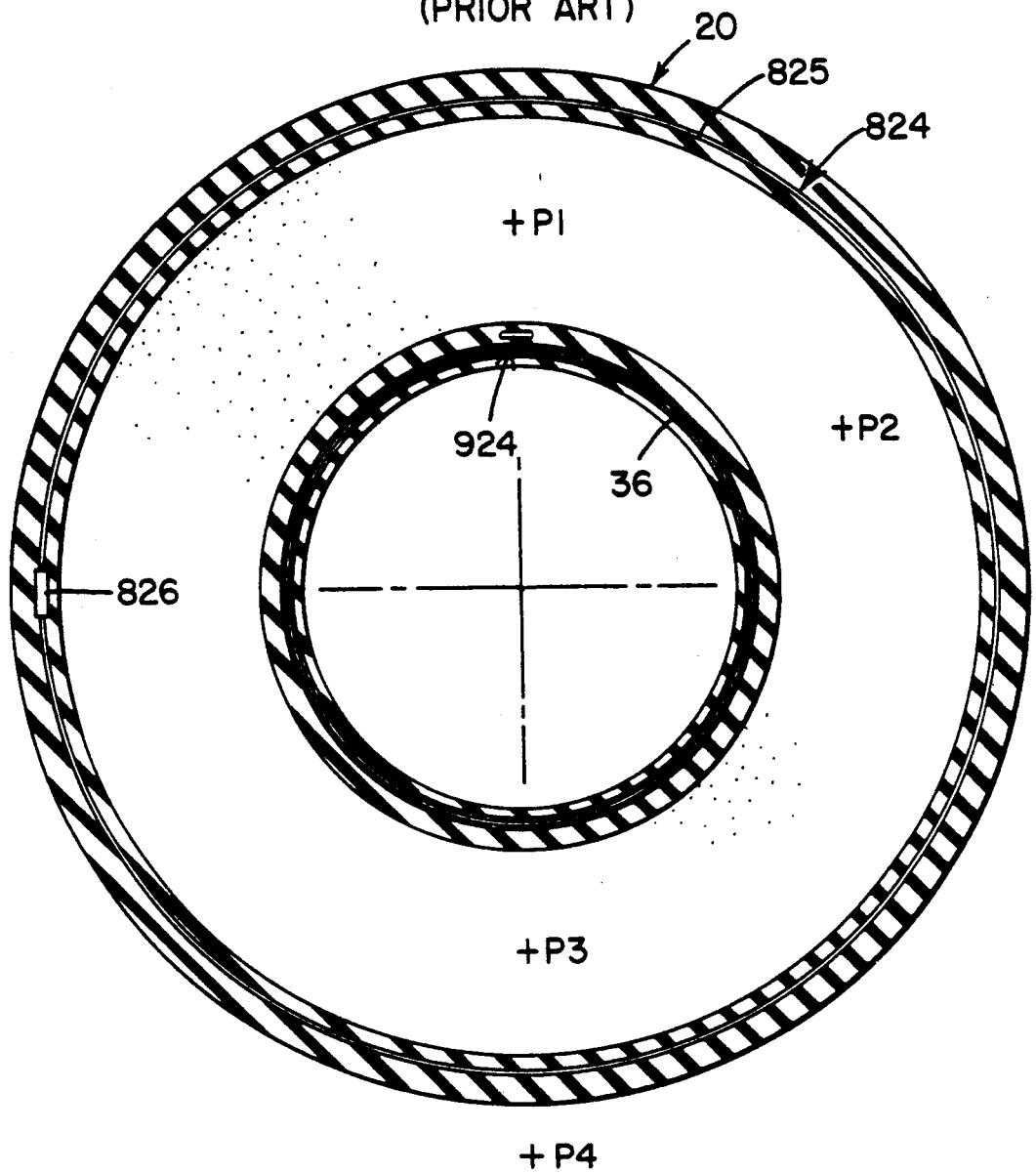
FIG. 12 is a sectional view taken along the line 12—12 in FIG. 11 and illustrates the prior art devices described in the PCT publication and a transponder device normally used in animal identification.
Figure 13:
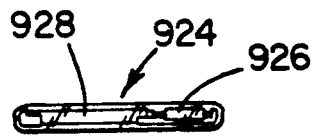
FIG. 13 is a sectional view of a glass-encapsulated integrated circuit transponder, normally used in animal identification and of the type now commercially available from Texas Instruments.

With reference now to FIG. 13, there is shown a cross sectional view of a prior art transponder 924 having an integrated circuit 926 and associated capacitor which are connected to an antenna 928 comprising a copper coil wound about a ferrite core. These components are enclosed within a glass or plastic tube, sealed at both ends, and suitable for use in animal identification. In the prior art FIG. 12, the transponder 924 is positioned as illustrated. With this positioning, it is possible with appropriate excitation from an exciter coil 27 (FIG. 11B), to read an identification at points P1 or perhaps P2 spaced some distance from the transponder 924. However, it has not been possible to read the transponder 924 from positions P3 and P4 located 180° from the transponder 924. (It has been found that performance of the transponder 924 can be improved somewhat if it is radially spaced a small distance from the annular tensile member 36 and if the axis of the coil in the transponder is parallel with the axis of the tire.)

The transponder 824 represents the location of the coil antenna and integrated circuit 826 described in the PCT publication mentioned in the Background Description above. The coil 825 in the transponder assembly 824 bears a substantially constant relation to positions P1, P2 and P3 located on the sidewall of the tire 20, and with respect to the position for the point P4 adjacent or on the tread of the tire. But, with reference to FIG. 11B, it may be seen that the positions 824, 824', or 824" are, as taught in the PCT publication, remote from the annular tensile member 36 and do not couple in the primary winding and secondary winding manner described in connection with the present invention.

It should be noted in this regard that the transponder 24 of the invention does not bear a constant relationship to either the sidewall or the tread of the tire, but instead is localized as is the animal-identification type transponder 924. Despite this nonconstant relationship to the tread and sidewall, the transponder and tire combination of the invention allows transponder interrogation and transmission of tire identification or other data from any location around the tire. Coupling of the transponder 24 to the annular tensile member 36 in a primary/secondary transformer relationship makes this possible.

Based upon the foregoing description of the invention, what is claimed is:

We claim:

1. A pneumatic tire having an integrated circuit transponder located within the structure of the tire for use in tire identification or data transmission, the tire having two spaced beads respectively including an annular tensile member of wound or cabled steel wire, the tire having a tread, sidewalls, an innerliner and a plurality of plies at least one of which is a continuous ply extending between the annular tensile member, respective ends of the continuous ply being turned axially and radially outwardly about the annular tensile members, the transponder having separate first and second electrodes, the transponder being able to transmit an electrical signal in response to an oscillating electromagnetic field emanating from a source in contact with or spaced from the tire, the pneumatic tire and transponder being characterized by:

an antenna having first and second leads connected respectively to the first and second electrodes of the transponder, the antenna comprising an electrical coil having a plurality of bunched turns and an area enclosed by such turns, the perimeter of the area being defined by the closed curve formed by the locus of points centered within the bunched turns, the area being circular or oblong with a diameter or maximum dimension across the area, the maximum dimension being greater than or equal to the cross sectional dimension of the bunched turns in the direction perpendicular to the area enclosed by the turns of the coil, the coil being positioned as a secondary winding associated with one of the annular tensile members as a primary winding, the coil being positioned between the inner and outer surfaces of the tire in a location at least partially overlapping the end of the continuous ply turned about the primary winding, the coil area being substantially less than the area enclosed by the primary winding annular tensile member, such coil and member having different axes such that the coil has a varying relationship with respect to points on the sidewalls and tread of the tire, the oscillating electromagnetic field to which the transponder is responsive during interrogation enabling a magnetic field component to pass through the area enclosed by the primary winding annular tensile member causing a magnetic field to encircle the primary winding, a portion of the magnetic field encircling the primary winding passing through the area enclosed by the turns of the coil, thereby, when the magnetic field is sufficiently intense, enabling transmission of the transponder's electrical signal via the antenna.

2. A pneumatic tire and transponder as in claim 1, the antenna coil being substantially planar, the plane of the antenna coil being substantially parallel with the continuous ply of the tire.

3. A pneumatic tire and transponder as in claim 1, the antenna coil being located radially outwardly of the annular tensile member comprising the primary winding and being located between the continuous ply and the portion of the continuous ply turned about the primary winding.

4. A pneumatic tire and transponder as in claim 3, the tire having an apex positioned between the continuous ply and the end of the ply turned about the primary winding, the antenna coil being positioned within the apex.

5. A pneumatic tire and transponder as in claim 1, the antenna coil having an elongated area and being positioned with the maximum dimension of the elongated area extending in the circumferential direction of the tire.

6. A pneumatic tire and transponder as in claim 2, the antenna coil having an elongated area and being positioned with the maximum dimension of the elongated area extending in the circumferential direction of the tire.

7. A pneumatic tire and transponder as in claim 3, the antenna coil having an elongated area and being positioned with the maximum dimension of the elongated area extending in the circumferential direction of the tire.

8. A pneumatic tire and transponder as in claim 2, the antenna coil being positioned between the innerliner of the tire and the continuous ply.

9. A pneumatic tire and transponder as in claim 8, the antenna coil having an elongated area and being positioned with the maximum dimension of the elongated area extending in the circumferential direction of the tire.

10. A pneumatic tire and transponder as in claim 1, the turns of the antenna being a flat coil of electrical conductor formed on or in a film substrate.

11. A pneumatic tire and transponder as in claim 1, the coil area including within it an elastomeric material filling a majority of such area, the transponder including a capacitor connected in parallel with the coil, the elastomeric material affecting the resonant frequency of the coil and capacitor.

12. A pneumatic tire and transponder as in claim 1, the antenna having the area enclosed by its turns filled with a material more flexible than the composite structure forming the continuous ply.

13. A pneumatic tire and transponder as in claim 11 wherein the antenna is elongated and is positioned with its maximum dimension extending in the circumferential direction of the tire.

14. A pneumatic tire and transponder as in claim 1, the transponder being energizable with a magnetic field oscillating at a frequency F less than or equal to 490 KHz, the transmission field strength in microvolts per meter being less than 2400/F. at a distance from the transmission source of 300 meters, the transponder being capable of being energized at such frequency and field-strength level using a transmitting antenna positioned near the primary winding but at a location with respect to the primary winding that is 180° away from the location of the transponder.

15. A pneumatic tire and transponder as in claim 14, the continuous ply being steel-cord-reinforced.

16. A pneumatic tire and transponder as in claim 8, the transponder including a pressure sensor located between the innerliner of the tire and the continuous ply, the pressure sensor being responsive to pressure within the pneumatic tire acting on the sensor through the innerliner.

17. A pneumatic tire and transponder as in claim 10, the transponder including a pressure sensor located between the innerliner of the tire and the continuous ply, the pressure sensor being responsive to pressure within the pneumatic tire acting on the sensor through the innerliner.

18. A pneumatic tire and transponder as in claim 16, the pressure sensor including a pressure transducer selected from the group consisting of a piezoresistive transducer, a silicon capacitive pressure transducer, a variable-resistance laminate of conductive ink, and a variable-conductance elastomeric composition, the pressure transducer being electrically coupled to the integrated circuit of the transponder, the integrated circuit converting the response of the pressure transducer to digital data transmitted by the transponder during transponder interrogation.

19. A pneumatic tire and transponder as in claim 1, wherein the integrated circuit of the transponder is mounted on a printed circuit board attached to the coil.

20. A pneumatic tire and transponder as in claim 19, the antenna coil having an elongated area and being substantially planar, the plane of the antenna coil being substantially parallel with the continuous ply of the tire, the maximum dimension of the area enclosed by the turns of the coil being substantially parallel with the steel wire comprising the primary winding annular tensile member, and the printed circuit board being attached to a long side of the antenna coil.

21. A pneumatic tire and transponder as in claim 20, the transponder including a pressure sensor and being located between the innerliner of the tire and the continuous ply, the pressure sensor including a pressure transducer mounted on or in the printed circuit board, the pressure sensor being responsive to pressure within the pneumatic tire acting on the transducer through the innerliner.

22. A pneumatic tire and transponder as in claim 20, the printed circuit board being attached to the center portion of a first long side of the coil adjacent the annular tensile member, the printed circuit board being unattached to a second long side of the coil.

23. A pneumatic tire and transponder as in claim 22, the printed circuit board having a plurality of openings filled with elastomeric material, thereby, to improve the adhesion of the transponder to the remainder of the tire structure.

24. A pneumatic tire and transponder as in claim 2, the transponder being in a material attached to the sidewall or innerliner of the tire.

25. A pneumatic tire and transponder as in claim 5, the transponder being in a material attached to the sidewall or innerliner of the tire.

26. A pneumatic tire having an integrated circuit transponder located within the structure of the tire for use in tire identification or data transmission, the tire having two spaced beads respectively including an annular tensile member of wound or cabled steel wire, the tire having a tread, sidewalls, an innerliner and a plurality of plies at least one of which is a continuous ply extending between the annular tensile members, respective ends of the continuous ply being turned axially and radially outwardly about the annular tensile members, the transponder having separate first and second electrodes, the transponder being able to transmit an electrical signal in response to an oscillating electromagnetic field emanating from a source in contact with or spaced from the tire, the pneumatic tire and transponder being characterized by:

an antenna having first and second leads connected respectively to the first and second electrodes of the transponder, the antenna comprising an electrical coil having a plurality of bunched turns and an area enclosed by such turns, the perimeter of the area being defined by the closed curve formed by the locus of points centered within the bunched turns, the area being circular or oblong with a diameter of maximum dimension across the area, the maximum dimension being greater than or equal to the cross sectional dimension of the bunched turns in the direction perpendicular to the area enclosed by the turns of the coil, the coil being positioned as a secondary winding associated with one of the annular tensile members as a primary winding, the coil being positioned between the inner and outer surfaces of the tire in a location at least partially overlapping the end of the continuous ply turned about the primary winding, the coil area being substantially less than the area enclosed by the primary winding annular tensile member, such coil and member having different axes such that the coil has a varying relationship with respect to points on the sidewalls and tread of the tire, the oscillating electromagnetic field to which the transponder is responsive during interrogation enabling a magnetic field component to pass through the are enclosed by the primary winding annular tensile member causing a magnetic field to encircle the primary winding, a portion of the magnetic field encircling the primary winding passing through the area enclosed by the turns of the coil, thereby, when the magnetic field is sufficiently intense, enabling transmission of the transponder's electrical signal via the antenna, the antenna coil being located radially outwardly of the annular tensile member comprising the primary winding, the plane of the antenna coil being substantially parallel to the continuous ply of the tire, and the maximum dimension of the area enclosed by the turns of the coil being substantially parallel to the steel wire comprising the primary winding annular tensile member.

27. A pneumatic tire and transponder as in claim 26, the tire having an apex between the continuous ply and the end of the ply turned about the primary winding, the antenna coil being within the apex.

28. A pneumatic tire and transponder as in claim 26, the antenna coil having an elongated area with the maximum dimension of the elongated area extending in the circumferential direction of the tire.

29. A pneumatic tire and transponder as in claim 26, the antenna coil being between the innerliner of the tire and the continuous ply.

30. A pneumatic tire and transponder as in claim 26, the turns of the antenna being a flat coil of electrical conductor formed on or in a film substrate.

31. A pneumatic tire and transponder as in claim 26, the coil area including within it an elastomeric material filling a majority of such area, the transponder including a capacitor connected in parallel with the coil, the elastomeric material affecting the resonant frequency of the coil and capacitor.

32. A pneumatic tire and transponder as in claim 26, the antenna having the area enclosed by its turns filled with a material more flexible than the composite structure forming the continuous ply.

33. A pneumatic tire and transponder as in claim 26, the transponder being energizable with magnetic field oscillating at a frequency F less than or equal to 490 KHz, the transmission field strength in microvolts per meter being less than 2400/F at a distance from the transmission source of 300 meters, the transponder being capable of being energized at such frequency and field-strength level using a transmitting antenna position near the primary winding but at a location with respect to the primary winding that is 180° away from the location of the transponder.

34. A pneumatic tire and transponder as in claim 33, in the continuous ply being steel-cord-reinforcement.

35. A pneumatic tire and transponder as in claim 28, the transponder as in claim 28, the transponder including a pressure sensor located between the innerliner of the tire an the continuous ply, the pressure sensor being responsive to pressure within the pneumatic tire on the sensor through the innerliner.

36. A pneumatic tire and transponder as in claim 35, the pressure sensor including a pressure transducer selected from the group consisting of a piezoresistive transducer, a silicon capacitive pressure transducer, a variable-resistance laminate of conductive ink, and a variable-conductance elastomeric composition, the pressure transducer being electrically coupled to the integrated circuit of the transponder, the integrated circuit converting the response of the pressure transducer to digital data transmitted by the transponder during transponder interrogation.

37. A pneumatic tire and transponder as in claim 26, wherein the integrated circuit of the transponder is mounted on a printed circuit board attached to the coil.

38. A pneumatic tire and transponder as in claim 37, the antenna coil having an elongated area and being substantially planar, the plane of the antenna coil being substantially parallel with the continuous ply of the tire, the maximum dimension of the area enclosed by the turns of the coil being substantially parallel with the steel wire comprising the primary winding annular tensile member, and the printed circuit board being attached to a long side of the antenna coil.

39. A pneumatic tire and transponder as in claim 38, the transponder including a pressure sensor and being located between the innerliner of the tire and the continuous ply, the pressure sensor including a pressure transducer mounted on or in the printed circuit board, the pressure sensor being responsive to pressure within the pneumatic tire acting on the transducer through the innerliner.

40. A pneumatic tire and transponder as in claim 38, the printed circuit board being attached to the center portion of a first long side of the coil adjacent the annular tensile member, the printed circuit board being unattached to a second long side of the coil.

41. A pneumatic tire and transponder as in claim 40, the printed circuit board having a plurality of openings filled with elastomeric material adapted to improve the adhesion of the transponder to the remainder of the tire structure.

42. A pneumatic tire and transponder as in claim 27, the transponder being a material attached to the sidewall of innerliner of the tire.

* * * * *